UNITED STATES PATENT OFFICE.

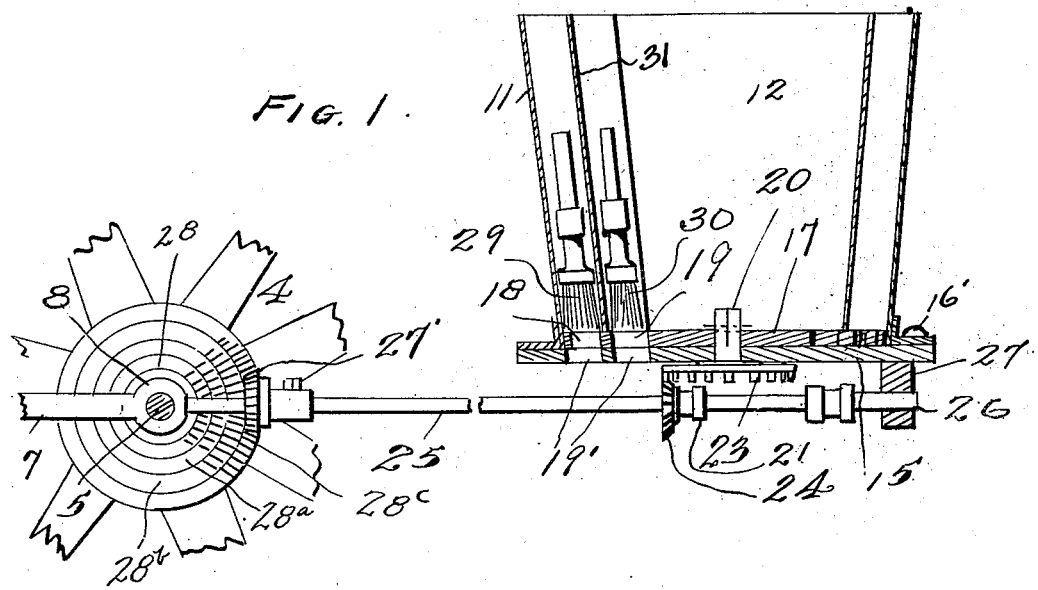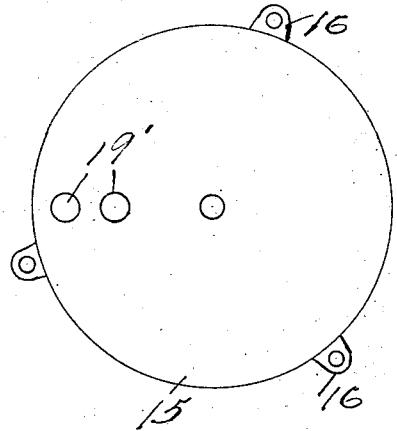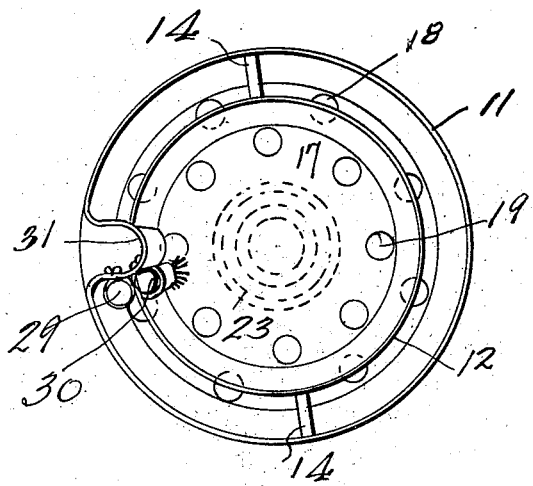

WILLIAM H. ARNN, OF LYNNVILLE, KENTUCKY.

SEED-PLANTER.

1,095,773.   Specification of Letters Patent.   Patented May 5, 1914.

Application filed August 7, 1913. Serial No. 783,566.

*To all whom it may concern:*

Be it known that I, WILLIAM H. ARNN, a citizen of the United States, residing at Lynnville, in the county of Graves and State of Kentucky, have invented certain new and useful Improvements in Seed-Planters, of which the following is a specification.

The present invention relates to improvements in seed planters, and is designed to provide a durable, simple and easily operated implement of this character from which different kind of seeds, as for instance corn and beans, may be planted in alternate rows, as the implement progresses over the ground.

The invention consists in certain novel combinations and arrangements of parts as will be apparent from the drawings and more clearly pointed out hereinafter in the specification and claim.

In the accompanying drawings I have illustrated one complete example of the physical embodiment of my invention constructed according to the best mode I have so far devised for the practical application of the principles of the invention.

Figure 1 is an enlarged detail sectional view showing the operating parts of my invention. Fig. 2 is a top plan view of the seed boxes and seed plate. Fig. 3 is a top plan view of the base plate.

All parts of the seed planter are supported from the frame which may be of metal or wood construction, and has attached thereto the handle bars, and braces as usual. Between the spaced parallel side bars of the frame, a covering wheel 4, is journaled, the shaft 5 being supported in bearings under the side bars and a hanger 7 also providing additional bearing, as at the center 8 for the shaft.

The seed box is of novel construction and comprises an outer receptacle 11 and an inner receptacle 12, a cover or top extending over both receptacles as a protection to their contents. The two receptacles are adapted to hold two different kinds of seeds, as corn and bean, and they are held separated by the brace bars 14 which are attached to the walls of the two receptacles and holds them up in rigid relationship.

The seed box is supported upon the base plate 15 which is attached, by bolts passed through the ears 16, to the frame, and the box 11 is fastened to the base plate as by bolts 16'. The inner seed receptacle or box, which is concentric with the outer box is open at the bottom, and its end is located above the base plate to permit introduction of the seed plate 17. The seed plate is a circular disk adapted to revolve inside the outer receptacle and under the open lower end of the inner receptacle. There are two sets of openings in the seed plate as 18 and 19, arranged in circular formation, one adapted to deliver seed from each receptacle, and arranged to pass alternately over the holes 19' in the base plate, which holes or perforations communicate with the delivery spout 9. To revolve the seed plate a shaft 20 is extended up through the base plate, and the seed plate is secured to the squared upper end of the shaft. At its lower end a bevel pinion 23 is fixed on the shaft to mesh with another pinion 24, the latter on the operating shaft 25 which is supported in the hanger 8 and at 26 in hanger 27. The operating shaft is revolved through the medium of the beveled pinion 27' and gears 28, $28^a$, $28^b$, $28^c$, the latter carried rigidly with the wheel section 4. A pair of brushes 29 and 30, one located above each series of seed openings in the seed plate, are provided to prevent delivery of only the seeds carried in the seed openings in the seed plate. These brushes are located directly over the perforations 19' of the base plate and are suspended from an inwardly bent portion 31 of the outer receptacle which projects radially into the inner receptacle in order that the brushes may be properly positioned.

Having thus fully described my invention, what I claim as new and desire to secure by Letters Patent, is:—

The combination of a seed box comprising two receptacles forming concentric spaces and a seed plate having an annular series of openings under each space, means for rotating the plate, a base plate having a perforation in the path of each series of openings, the outer receptacle having an inwardly bent portion projecting radially into the inner receptacle, and a pair of brushes attached to said portion and suspended over said openings.

In testimony whereof I affix my signature in presence of two witnesses.

WILLIAM H. ARNN.

Witnesses:
NOAH CALDWELL,
HENRY M. CANTER.

Copies of this patent may be obtained for five cents each, by addressing the "Commissioner of Patents, Washington, D. C."